May 24, 1960   L. G. BRODRICK ET AL   2,938,187
RIGHT ANGLE COMPONENTS SOCKET
Filed June 26, 1957
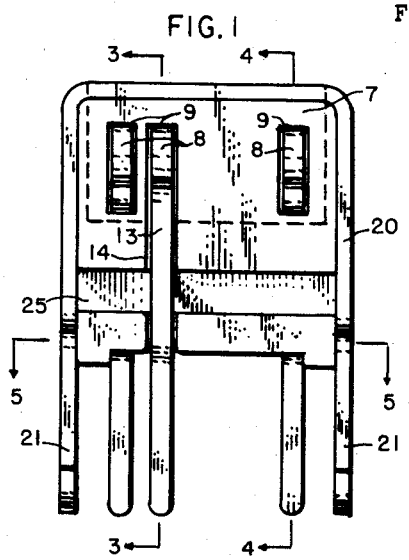
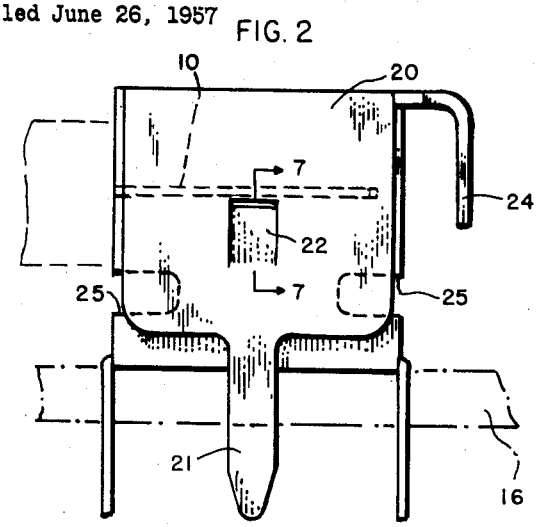
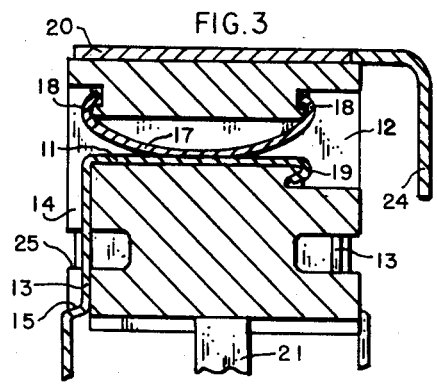
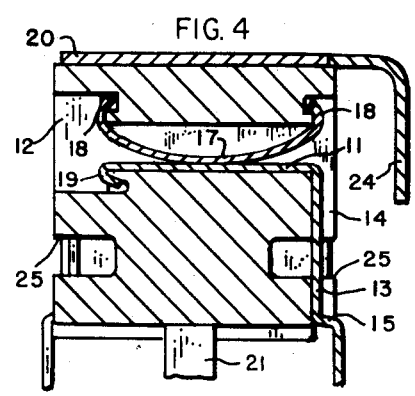
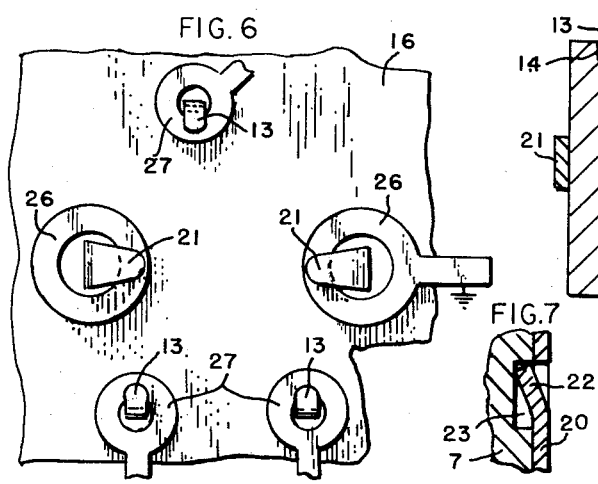
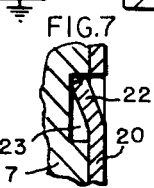
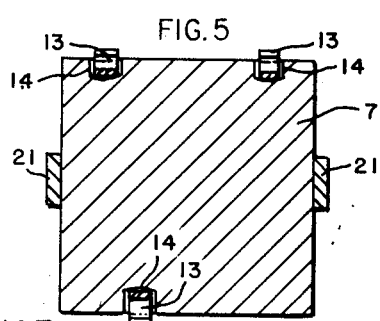
*INVENTORS,*
LOWELL G. BRODRICK
BY JOSEPH P. MORONE, JR.
Harry M. Saragovitz
ATTORNEY United States Patent Office
2,938,187
Patented May 24, 1960

2,938,187

RIGHT ANGLE COMPONENTS SOCKET

Lowell G. Brodrick and Joseph P. Morone, Jr., Indianapolis, Ind., assignors to the United States of America as represented by the Secretary of the Army Filed June 26, 1957, Ser. No. 668,272

4 Claims. (Cl. 339—31)

The invention relates in general to improvements in the structure of component parts of electronic apparatus and particularly to socket members for receiving replaceable components which may be incorporated in the apparatus by insertion in the socket.

In compact and miniaturized equipment it is known that soldering operations are difficult to make properly and are quite apt to cause trouble in a circuit. Such trouble may arise from many sources, one such source may be the migration of solder, or the products of soldering operations, to areas where frictional contact alone must serve to carry current. At such areas the solder itself may prevent removal of the frictional connectors and cause variable degrees of impedance to interfere with proper operation of the apparatus and also such undesirable products sometimes contain corrosive substances which may cause undesirable increased resistance in conductors or decreased resistance in insulators.

The invention provides a socket device in which a reservoir is provided adjacent to the areas which must be protected from accumulation of foreign substances such as surplus solder, flux, coating materials, or all such substances. This reservoir acts as a stop gap to prevent harmful flow of the unwanted substances. The reservoirs also prevent the harmful flow of foreign matter to areas between adjacent conducting members because the substantial capacity of the reservoirs receive and trap the foreign substances before they can migrate to critical regions in the circuitry.

A further feature of the invention relates to the protection of the apparatus against malfunction by preventing careless or accidental incorrect insertion of components into their sockets.

In so-called right angled sockets a transistor, or other component, is inserted in a position where its contact pins are substantially parallel to and the component is closely adjacent the supporting surface thereby enhancing the compactness of the whole assembly. It has been found in such socket designs that careless operators or service personnel may insert or attempt to insert the components from the wrong direction thereby improperly aligning the component with consequent circuit unbalance and possible damage to contact pins or adjacent components. To forestall such undesirable effects the invention provides a combination guard and socket mounting device which will force the operator to properly insert the component.

It is a primary object of the invention to provide a socket construction which is protected from possible loss of operating efficiency due to contamination of its contacting electrodes by soldering operations.

It is a further object of the invention to provide an electronic component socket which will receive miniature tubes or other devices having closely spaced electrodes wherein the possibility of short circuiting the tube pins or the socket terminals is reduced to a negligible factor. Undesirable inductive and capacitive effects between terminals and leads are also reduced.

A still further object of the invention is to provide a socket which is universal in its adaptability to assembly design and the most efficient placement of components and their necessary interconnections.

A still further object of the invention is to provide a socket of universal application wherein the improper insertion of components in the socket is prevented.

A further object of the invention is to provide a miniature type socket having the advantages above indicated and wherein the component such as a tube received by the socket lies parallel and close to the mounting surface.

Other objects and features of the invention will more fully appear from the following description and will be particularly pointed out in the appended claims.

To present a better understanding of the invention a particular embodiment thereof will be described and illustrated in the accompanying drawings wherein:

Fig. 1 is a side elevation of the socket;
Fig. 2 is an end elevation of the device;
Fig. 3 is a cross section on line 3—3, Fig. 1;
Fig. 4 is a cross section on line 4—4, Fig. 1;
Fig. 5 is a horizontal cross section on line 5—5, Fig. 1;
Fig. 6 is a bottom plan view of the socket attaching means;
Fig. 7 is a cross section on line 7—7, Fig. 2.

The body 7 of the socket desirably is made of a suitable dielectric material and may be molded in the desired form. The particular device illustrated was made to receive a transistor of the type having three projecting pins connected to the respective transistor elements. Such a device is shown schematically in dotted lines in Fig. 2. The socket may, however, be made to receive other types of components such as multielement miniature or subminiature electronic tubes. The socket shown is of the so-called right angle type adapted to receive the contacting pins of the components in a position parallel to the mounting surface. The principles of the invention may equally well be applied to the more conventional type of socket wherein the component pins are received in a position perpendicular to the mounting surface.

Each of the socket electrodes 8 are received within suitably formed recesses 9 in the body 7 and are shaped of spring metal such as hard copper, bronze or other electrically conductive material. Each recess extends through the body and is isolated from the other recesses by a wall of dielectric of substantial thickness and the electrodes are so held that they cannot come in contact with each other.

Referring to Fig. 3, it will be seen that the electrodes are made up of two sections between which the component pins 10 are frictionally received. One of the sections, for example the section 11, extends substantially throughout the length of the recess and is locked in position at one end by means of a reverse bend in the electrode which engages a lip of dielectric material. This end of the recess is enlarged at 12, Fig. 4 to permit reception of the electrode end portions at a position remote from the side face of the body 7 for reasons which will appear hereinafter. The other end of this electrode section 11 is bent downwardly at right angles to its horizontal portion to form a terminal portion 13 which lies within a vertical channel 14 connected with the recess 9. The terminal portion is bent outwardly and downwardly at 15 to provide a suitable soldering area in the event that the circuitry requires a connection be made to the electrode at the top face of the component supporting panel 16.

The spring sections 17 of the electrodes 8 are anchored in the recesses 9 by reversely bent end portions 18 which interlock with projecting lugs of the body dielectric material. Other suitable means may be arranged to secure the electrode section 17. As shown this section 17 is curved outwardly away from the recess wall toward the section 11 to provide the required spring pressure for securely holding the pins of the inserted component. Other means may be provided for establishing the required pin holding pressure such as by bending both sections 11 and 17 inwardly.

The electrode section 11 is held firmly in place by reason of extra spring tension set up therein at its right angle bend which together with its reversely bent end portion 19 constitutes effective anchoring means. It should be understood that the electrodes 8 may be of one piece structure or of other suitable form.

Each of the electrodes 8 are, or may be, of identical construction but desirably adjacent electrodes are positioned in the body 7 so that the terminals 13 extend downward along opposite faces of the body 7. In this manner maximum separation of the leads in the circuit, of which the socket and its component are a part, is established.

An added feature of the invention is shown in the accompanying drawings. Such feature is useful in connection with certain electronic components where it is desirable or necessary that when the component is inserted in the socket one or more of their elements make contact with the socket electrodes before the others. For example, under certain conditions it is desirable that the center or base pin of a transistor be connected first.

It will be noted that the center electrode 8 has the pin receiving ends of its elements 11 and 17 positioned relatively close to the front face of the socket while the corresponding ends of the other electrodes 8 are positioned inward from the front face of the socket a greater distance than the center electrode as shown in Figs. 3 and 4.

In the socket shown, which is made for three pin transistors, the recesses 9 in the body 7 are so arranged that the elements 11 and 17 of all the electrodes 8 may be identical but their position in the socket body provides for the desired sequence of contact when the transistor is inserted.

It is suggested that by slight changes in the mold for the body 7 and in the length dimensions of the electrodes 8 the socket may be modified to receive a variety of components having widely different specifications.

It should be particularly pointed out that the socket of the invention is highly useful in connection with printed circuit techniques. The terminals 13 may extend through the circuit panel 16 and serve as securing means for the socket. However, if the assembled circuit is to receive unusually rough handling and must be reliable in performance under all conditions a metal retaining band 20 is provided which embraces the body 7 of the socket and is provided with downwardly extending lugs 21 adapted to extend through the mounting card or panel and be clinched thereto to rigidly anchor the socket. Desirably also means are provided to secure the band 20 to the socket body. This may be done by providing holding lugs 22 punched inward from the metal of the band. These lugs snap into locking engagement with holding recesses 23 in the socket body when the band is forced into position on the socket body as shown in Fig. 7. One or more of the lugs 22 may be provided on each side of the band.

The band is further provided with a guard 24 desirably formed integral therewith. The guard 24 insures insertion of the transistor or other component at the correct side of the socket only. Moreover the guard may be assembled to the socket in either of two positions which choice enlarges the facility of the socket for adaptation to receive many types of components and for insertion of the component in its most effective position in the circuit.

A further important aspect of the invention provides for protection of the contacting electrodes 8 against corrosion and contamination due to excessive flow of soldering flux, solder, by-products of the soldering operation, or other contact contaminating substances. To effect such protection, traps are provided to receive and render harmless all foreign matter tending to migrate to the pin contacting areas. To accomplish this desirable end channels 25 are formed in the body 7 extending horizontally across opposite sides thereof. In this manner surplus flux, solder, or other undesired substances which flow along the terminals 13, during or subsequently to the soldering operation, are provided with a space in which they may harmlessly be received. The channels provide sufficient space and scope of movement for the foreign substances to forestall their further migration to critical contacting areas.

In Fig. 6, a bottom plan view of a typical installation of the socket is shown. This installation is made in connection with a printed circuit. The lugs 21 are projected through holes in the card or panel 16 and are clinched over to provide effective anchorage. The terminals may also be soldered to metal pads 26 which may be part of the pattern of the printed circuit or not. To take advantage of the shielding effect of the band 19, one of the pads 26 may be grounded.

The three terminals 13 of the electrodes 8 extend through holes in the card 16 and are soldered or otherwise mechanically and electrically secured to pads 27 which are integral parts of the main circuit including the transistor or other component in the socket.

What is claimed is:

1. A socket for receiving pin contact electronic components comprising a unitary body of dielectric material presenting a mounting face to engage its support, a plurality of spaced recesses extending through said body substantially parallel to the mounting surface, component pin contacting electrodes in said recesses permitting insertion of component pins at either end, means to make circuit connections to said electrodes, a securing strap embracing said socket body and having means to secure it to the mounting surface, a reversible guard member secured to said strap and extending into a position to permit insertion of a component from a selected side of the socket only.

2. A socket for receiving pin contact electronic components according to claim 1 and trapping chambers operable to prevent capillary migration of contaminating materials from reaching the contact area of said terminals.

3. A socket for receiving pin contact electronic elements comprising a unitary body of dielectric material presenting a mounting face to engage its support, a plurality of spaced recesses extending through said body disposed substantially parallel to the mounting surface, double ended pin contacting electrodes in said recesses, terminals on said electrodes for connection to a circuit, said terminals extending from the electrodes along the sides of said body to the socket base, at least one channel in the sides of said body positioned to be bridged over by said terminals and a reversible guard secured to the socket extending over a selected end of the said electrode receiving recesses.

4. A socket for receiving pin contact electronic components according to claim 3 and a socket securing strap embracing the socket and having means to lock it upon the mounting surface, said guard being formed integral with said strap.

References Cited in the file of this patent

UNITED STATES PATENTS

| | | |
|---|---|---|
| 2,137,617 | Imes et al. | Nov. 22, 1938 |
| 2,477,862 | Cook | Aug. 2, 1949 |
| 2,613,244 | Del Camp | Oct. 7, 1952 |
| 2,674,105 | Prosek | Apr. 6, 1954 |
| 2,860,318 | Morone | Nov. 11, 1958 |
| 2,863,131 | Carlzen et al. | Dec. 2, 1958 |